(12) United States Patent
Niemann et al.

(10) Patent No.: US 10,107,671 B2
(45) Date of Patent: Oct. 23, 2018

(54) DEVICE FOR DETERMINING THE FILLING LEVEL OF A FLUID

(71) Applicant: Hella KGaA Hueck & Co., Lippstadt (DE)

(72) Inventors: Thomas Niemann, Delmenhorst (DE); Juergen Palloks, Westerstede (DE); Bastian Kanning, Bremen (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 540 days.

(21) Appl. No.: 14/804,805

(22) Filed: Jul. 21, 2015

(65) Prior Publication Data
US 2016/0018249 A1 Jan. 21, 2016

(30) Foreign Application Priority Data
Jul. 21, 2014 (DE) .................. 10 2014 010 616

(51) Int. Cl.
| *F01M 11/12* | (2006.01) |
| *G01F 23/296* | (2006.01) |
| *G01K 7/02* | (2006.01) |
| *F01M 11/04* | (2006.01) |

(52) U.S. Cl.
CPC ....... *G01F 23/296* (2013.01); *F01M 11/0408* (2013.01); *F01M 11/12* (2013.01); *G01K 7/02* (2013.01); *F01M 2011/0441* (2013.01)

(58) Field of Classification Search
CPC ............................................ F01M 2011/0441
See application file for complete search history.

(56) References Cited

U.S. PATENT DOCUMENTS

| 4,570,483 | A | | 2/1986 | Sobue | |
| 4,995,415 | A | * | 2/1991 | Weber | F23N 5/107 |
| | | | | | 122/507 |
| 2008/0016960 | A1 | * | 1/2008 | Zimmermann | G01F 23/22 |
| | | | | | 73/295 |

(Continued)

FOREIGN PATENT DOCUMENTS

| DE | 4011112 | 9/1991 |
| DE | 102005056895 | 5/2007 |

(Continued)

*Primary Examiner* — Lisa Caputo
*Assistant Examiner* — Alex Devito
(74) *Attorney, Agent, or Firm* — Muncy, Geissler, Olds & Lowe, P.C.

(57) ABSTRACT

A device for determining the filling level of a fluid in a container, in particular in the oil reservoir of a vehicle, is provided. The device has at least one sensor element, at least one control unit, at least one energy source, and at least one transmitting unit for wireless transmission of measured data. The at least one energy source is a thermal generator, in particular a thermocouple. The device has at least one energy storage device. The thermal generator is configured for measuring a time-dependent temperature gradient, the thermal generator has a signal-conducting connection to the control unit, and the control unit is configured for placing the device from an energy-saving state into a ready-to-measure state. A method for determining the filling level of a fluid in a container using the device, and a vehicle with the device, in particular a motor vehicle, are also provided.

16 Claims, 1 Drawing Sheet

(56) References Cited

U.S. PATENT DOCUMENTS

| | | | |
|---|---|---|---|
| 2009/0303059 A1* | 12/2009 | Von Lintzgy | G01F 23/0076 340/621 |
| 2010/0101317 A1 | 4/2010 | Ashrafzadeh et al. | |
| 2010/0271199 A1 | 10/2010 | Belov et al. | |
| 2011/0254514 A1 | 10/2011 | Fleming | |
| 2014/0188404 A1 | 7/2014 | Von Herzen et al. | |

FOREIGN PATENT DOCUMENTS

| | | |
|---|---|---|
| DE | 102010048950 | 4/2012 |
| DE | 102011087981 | 6/2013 |
| EP | 2816330 | 12/2014 |

\* cited by examiner

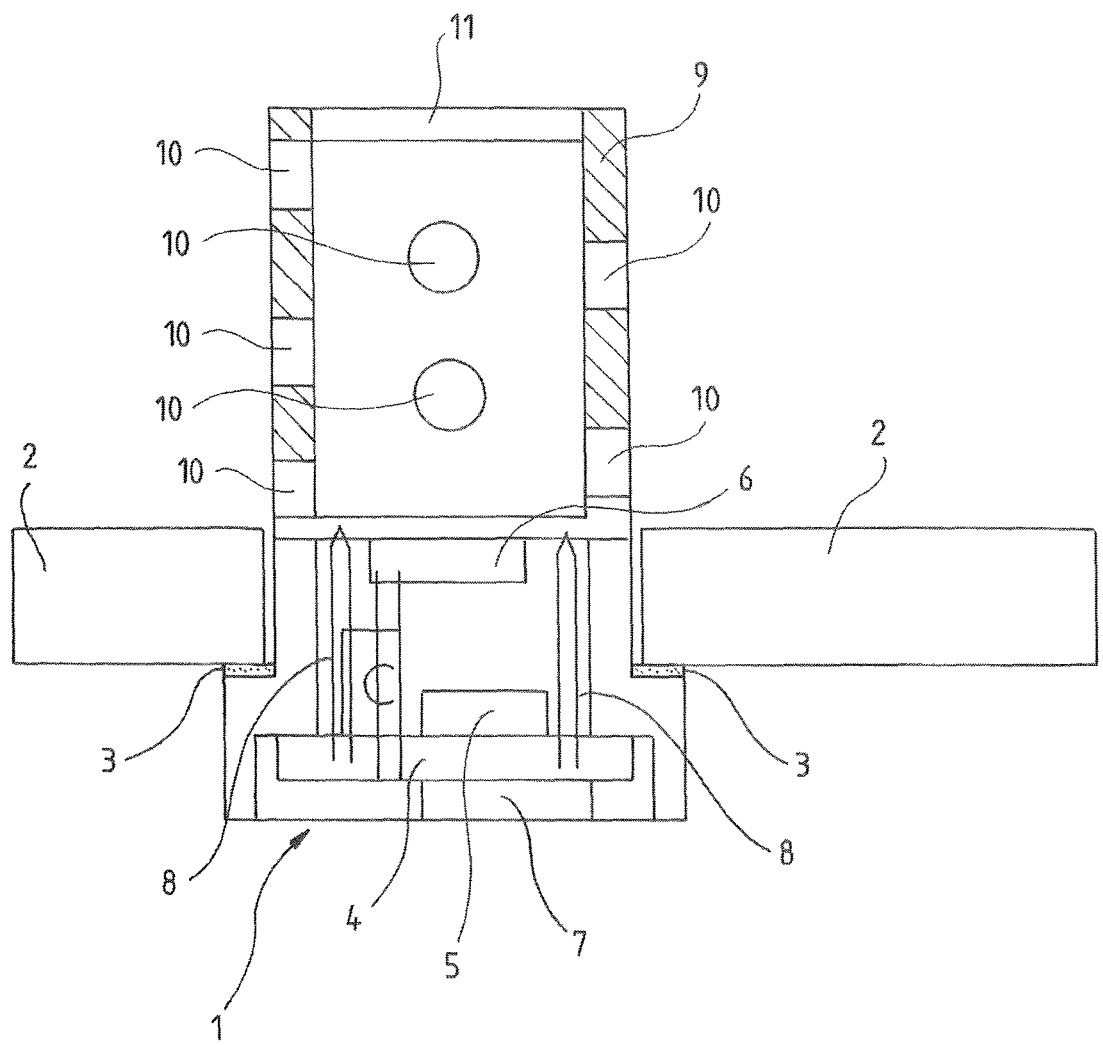

DEVICE FOR DETERMINING THE FILLING LEVEL OF A FLUID

BACKGROUND OF THE INVENTION

Field of the Invention

The invention relates to a device for determining the filling level of a fluid in a container, in particular in the oil reservoir of a vehicle, wherein the device is configured as a closure means of the container and comprises at least one sensor element and at least one control unit.

Brief Discussion of the Related Art

A device for determining the filling level of a fluid is, for example, known from the DE 10 2005 056 895 A1. Here the filling level is determined by means of a runtime measuring method with ultrasound signals. The aim is to achieve an improved decay behaviour and a reduction in interfering resonances, whereby fastening elements and corresponding counter-elements are configured as a one-piece fastening unit.

Furthermore a device of the kind mentioned in the beginning is known from the DE 40 11 112 C2. Here a measuring means for determining the oil level in an oil sump comprising an oil draining screw, of a combustion engine is described. The oil level is ascertained via static pressure, wherein the electric pressure measuring cell is arranged on the bottom of the oil sump. In particular, the measuring device is integrated with the oil draining screw. To display the measuring results the measuring device is connected with an electrical indicating means.

Assembly of the measuring means is difficult because of the cable-bound energy supply and data transfer. An easy and quick assembly and disassembly of the measuring means is not possible. In addition additional installation space is required as a result of the cabling, and cabling of the sensor may sometimes be complicated and thus time- and cost-consuming due to problems with space.

SUMMARY OF THE INVENTION

The invention is based on the requirement to propose a device for determining a filling level of a fluid, where all cabling of the device can be omitted and where assembly and disassembly is particularly easy.

The solution to this requirement is a device, method, and vehicle with the characteristics set forth in the present claims.

Further developments and advantageous designs are indicated in the respective sub-claims.

With a device for determining the filling level of a fluid in a container, in particular the oil reservoir of a motor vehicle, wherein the device is configured as a closure means of the container and comprises at least one sensor element and at least one control unit, provision is made according to the invention for the device to comprise at least one energy source and at least one transmitting means for the wireless transmission of data, the at least one energy source to be a thermal generator, the device to comprise at least one energy storage means, the thermal generator to be configured for measuring a temperature gradient, the thermal generator to comprise a signal-conducting connection to the control means and the control means to be configured for placing the device into an energy-saving and a ready-to-measure state.

The closure means which is how the device is configured, may for example be arranged in the bottom of an oil reservoir of a motor vehicle. Due to the fact that the device has its own energy source, it is independent of a cable-bound power supply. Expensive cabling may therefore be omitted. This means that a lot of time and thus costs can be saved during assembly of the sensor device, since all that is needed is to mount the closure means on the oil reservoir in the appropriate place. Furthermore because there is then no need for a cable-bound power supply, for example when used in a motor vehicle, the overall weight of the vehicle is reduced, which in turn contributes to a more energy-efficient operation of the motor vehicle. In order to ensure a completely wireless function of the device, the data recorded by the sensor must also be transmitted wirelessly. To this end the device comprises a transmitting means. The transmitting means enables the measured data, for example the filling level data, to be wirelessly transmitted to a central data node. There are several data transmission standards such as Bluetooth or other radio standards, which may be used for this purpose. Receipt and evaluation of data can be handled in data nodes which already exist in the vehicle, such as for evaluating tyre pressure data or radio-controlled access keys. The energy source may be a thermal generator, in particular a thermocouple. A thermal generator is constructed in such a way as to utilise the temperature difference between a fluid such as engine oil in an oil sump and the ambient temperature based on the Seebeck effect, in order to generate electric voltage. A thermocouple may for example consist of two different electrically conducting materials connected with each other. An electric voltage is built up due to different temperatures at the contact points of the two conductive materials. The voltage generated due to the Seebeck effect may be used to supply the device with electric energy. There is therefore no need for an external power supply for example via cabling. It is also possible to use a battery, preferably a long-life battery, which needs to be replaced at certain intervals. A battery may, for example, be arranged in a holder on the closure means. The energy generated by a thermal generator may be stored in an energy storage means. A capacitor or an accumulator may serve as an energy storage means. The energy stored in the energy storage means may be held ready for use when measurements need to be taken. A temperature gradient of the fluid, in particular of an engine oil, to be measured can be determined by the thermocouple of the thermal generator. When the vehicle is in operation the engine oil is set into motion and heats up. When in motion the oil level cannot be accurately measured due to the motion and the changing surface of the engine oil. When the engine is switched off the engine oil cools down. By determining the temperature, i.e. the time-dependent temperature gradient of the engine oil via the thermocouple, the operating state of the engine, in particular the switched-off state of the engine, can be detected. Information on a corresponding temperature gradient may be detected by the control means via the thermal generator, so that the device can be changed from an energy-saving state into a ready-to-operate state. Because the engine is switched off and the oil has calmed down, precise measurement of the oil level is possible. After measurements have been taken, the measured data can e.g. be forwarded to a wireless connection, and thereafter the device can again be placed into an energy-saving mode. While the device is in the energy-saving state the thermal generator can continue to produce energy which can be stored in an energy storage means. The energy storage means is where the energy required for taking measurements in the ready-to-measure state is held ready.

In a further embodiment of the invention the device comprises a receiving means for wireless data transmission. Apart from the transmitting device the device may comprise a receiving means for wireless data transmission in order to receive for example control data from a central control unit. Thus for example, the taking of measurements by the device may be initiated by the control unit in a motor vehicle and the results may be retrieved via the transmitting means of the device when this measured data is required.

In a preferred embodiment of the invention the closure means is configured as an oil draining screw. By configuring the device as an oil draining screw of an oil reservoir of e.g. a motor vehicle, assembly and disassembly of the device is made particularly easy. Also retrofitting the device is easy because the originally fitted oil draining screw may be simply exchanged for an oil draining screw according to the invention when an oil change becomes necessary. Further, due to arranging the oil draining screw in the lower region of the oil reservoir, precise measuring of the filling level of the oil is possible for example with the aid of an ultrasonic transducer. Just as a normal oil draining screw the oil draining screw according to the invention may comprise a screw-in thread, so that no further assembly components are needed. Furthermore, because of the wireless data transmission and the device's own energy source, no further openings are needed in the oil reservoir for e.g. laying cables. The device is completely received on the closure means, in particular the oil draining screw. The device is thus free from cables and free from other physical connections to areas outside the closure means.

In a further embodiment of the invention the sensor element is an ultrasonic transducer. The ultrasonic transducer here may be a piezo-electric ultrasonic generator, via which ultrasound-based measuring of the filling level is made possible.

In a further embodiment of the invention the device comprises a tube-like extension protruding into the container, the circumference of which surrounds the sensor element. For example, the device may be configured as an oil draining screw which is fitted from below into an oil reservoir, such as an oil reservoir of the motor vehicle. The sensor unit, for example a piezo-electric ultrasonic generator, is preferably arranged flush with the level of the inner floor of the oil reservoir. In order to ensure accurate determination of the filling level in the oil reservoir, the oil should be calm. In support of this, the device may comprise a tube-like extension, which protrudes into the oil reservoir. The tube-like extension may be arranged so as to protrude into the container flush with the outer edges of the oil draining screw. Preferably the sensor element is arranged in the centre of the preferably circular cross-section of the tube-like extension. The tube-like extension may be open on its face facing the container and may comprise openings in its lateral wall for the exchange of media between the container volume and the interior of the extension. The oil can enter into the tube-like extension through these lateral openings and the upper opening and is calmed in there by the walls of the extension. The lateral openings are preferably arranged at different levels offset relative to each other. Several openings may be arranged one below the other. Preferably the size of the lateral openings is 15-25% of the size of the upper opening facing the container. This ensures particularly good calming of the oil without the measuring results being falsified by the tube-like extension. The tube-like extension therefore acts as a calming tube. The existence of such a calming tube or other calming element is not mandatory for the function of the device, but it is advantageous.

In a constructive further development of the invention at least sections of the tube-like extension are adapted in shape and size of the cross-section to the shape and size of the cross-section of the closure means. Preferably the tube-like extension is adapted to the outer wall of the closure means and is fastened thereto. This makes it easy to install the tube-like extension in the container through the opening, such as the oil drain openings in an oil reservoir.

Furthermore the invention relates to a method for determining the filling level of a fluid in a container with a device as described above. According to the invention provision is made for the device to be changed from the energy-saving state into a ready-to-measure state when the energy storage means comprises an electric charge which is sufficient for operating the device, for at least one extra condition to be met and for the filling level of fluid to be determined by the device when in the ready-to-measure state. The device can be placed into an energy-saving state. Thus due to energy being saved it is possible to ensure prolonged operation using a long-life battery or other energy storage means charged by a thermal generator. For example, the device may be placed into an energy-saving state, when starting the engine of a motor vehicle, wherein the filling level in the oil reservoir shall be determined. Accurate measuring of the oil level is difficult in a moving vehicle because the oil volume is not quiet. Placing the device into a ready-to-measure state is meaningful only, if the electric charge in an energy storage means is sufficient or if a thermal generator produces sufficient energy for supplying the device. An extra condition which must met in order to place the device into the ready-to-measure state when used in a motor vehicle, may for example be a switched-off engine.

In a further embodiment of the method the extra condition is a specified time-dependent temperature gradient of the fluid. For example a time-dependent temperature gradient of, for example, the engine oil may be used to detect a cooling-down of the engine oil. Cooling of the engine oil is also an indication that the vehicle has come to a standstill, thus making the taking of more accurate measurements of the filling level of the oil possible. When detecting a corresponding temperature gradient, the device is placed into the ready-to-measure state for measuring. If the filling levels are determined only when the engine is switched-off, measurements may be taken at larger time intervals, leading to further energy savings. When taking measurements with the engine switched off, there is no longer any need for the sensor device to be covered such as by a damping cup, but use of a calming tube is nevertheless advantageous.

In a further embodiment of the method the time-dependent temperature gradient of an engine oil is determined, and when the graph of the engine oil temperature shows a progression from higher to lower temperatures, this indicates that the engine has come to a standstill and the device is placed from an energy-saving state into a ready-to-measure state. The cooling of the engine oil is a good indicator for the fact that the engine of the vehicle has been switched off and the vehicle is therefore at a standstill. Measuring the oil temperature may be made possible using the thermocouple provided in the device, so that there is no need for additional sensor elements. The standstill of the vehicle can thus be detected by the device independently of other sensor systems. Detecting the standstill of the vehicle allows the point in time to be detected, at which accurately measuring the oil level is possible.

In a further embodiment of the method the operating state of the engine is determined, wherein a switched-off engine is a further extra condition for placing the device from an energy-saving state into a ready-to-measure state. Further external sensors are possible for detecting the operating state of the engine. External sensors but also other means capable of detecting the operating state of the engine may be used to send information on the standstill of the engine to the device. Based on this information it is possible to make sure that measuring of for example the oil level is carried out. Moreover by detecting the operating state of the engine with the aid of external sensors it is possible to employ sensors for also measuring fluids which do not heat up, such as fuel, while the vehicle is in operation.

In a further embodiment of the method the energy converted by the thermal generator in the energy-saving mode of the device is stored in at least one energy storage means. While the vehicle is in operation, the device is preferably in energy-saving mode because taking precise measurements is difficult due to the vehicle being in motion. While the vehicle is in operation, the fluid such as the engine oil may heat up resulting in a temperature difference at the thermal generator of the device. Due to the Seebeck effect the thermal energy can be converted into electric energy, which in turn can be stored in an energy storage means. The stored energy can be made available to the device by the energy storage means when the device is in a ready-to-measure state. The Seebeck effect can thus be utilised in a particularly efficient manner, thereby ensuring an operation of the device which is independent of external energy sources.

In a further embodiment of the method the extra condition consists in the receiving of an ignition signal of the engine, when an ignition signal is received the device is placed into a ready-to-measure state and the filling level of the fluid is determined. The ignition system of the vehicle for starting the engine may be equipped with a signal generator which transmits a signal as soon as the ignition is actuated, i.e. the engine is started. When this signal is received by the control means of the device the device can be placed into a ready-to-measure state, and the filling level of the fluid can be measured. At the moment the ignition is actuated and the signal is transmitted, the engine and the engine oil are not yet in motion thereby permitting accurate measuring of the filling level of the engine oil. The ignition signal may be communicated by radio transmission.

In one further embodiment of the method the measured data is transmitted by radio transmission to an evaluation device, and the device is placed into an energy-saving state after sending the measured data. Due to transmitting the measured data by radio transmission to an evaluation device, there is no need for any cable connections of the sensor device. The measured data may, for example, be sent to a control device in a motor vehicle, which is part in an existing wireless communications network of the vehicle. Such a communications network may for example already exist in the vehicle for detecting tyre pressure or for authenticating a radio access key. Following data transmission the sensor device is placed into an energy-saving state in order to increase energy efficiency of the system.

A further aspect of the invention relates to a vehicle, in particular a motor vehicle, with an above-described device. A sensor device of the kind described is particularly suitable for use in a motor vehicle. Many motor vehicles are already equipped as standard with wireless communications networks and these can be utilised by the sensor means for the transmission of data. The only assembly steps required consist in fitting the sensor device into the drain outlet of the oil sump.

BRIEF DESCRIPTION OF THE DRAWINGS

The invention will now be explained in further detail with reference to the embodiment illustrated in the drawing. In detail:

The sole FIGURE shows a sectional view of a device according to the invention which is configured as an oil draining screw mounted in an oil reservoir.

DETAILED DESCRIPTION OF THE PREFERRED EMBODIMENTS

The FIGURE shows a device according to the invention which is configured as an oil draining screw 1 for mounting in an oil sump of a motor vehicle. The device is mounted into an oil drainage opening of the floor 2 of the oil sump. The oil draining screw 1 is sealed against the floor of the oil sump 2 by a sealing element 3, for example an O-ring. The device comprises a circuit board 4 with a circuit 5 arranged on it. The circuit board 4 is connected with a sensor element 6, which is configured as a piezo-electric ultrasonic generator. Wireless transmission of the measured data to a control device in the motor vehicle is possible via a transmitting and receiving means 7. For energy supply the device comprises thermocouples 8. Due to the different temperatures present on the side facing the oil sump and the side of the thermocouples facing the environment, an electric voltage is generated at the thermocouples due to the Seebeck effect. The voltage generated may be stored in the form of electric energy in an energy storage means of the device and can be made available to the sensor device for operation. The oil draining screw comprises a tube-like extension 9 which protrudes into the oil sump. The wall of the tube-like extension comprises lateral openings 10 and an upper opening 11 on the face facing the container, through which the oil gets into the interior of the tube-like extension. The lateral openings are arranged at different levels offset relative to one another and their sizes range from 15% to 25% of the size of the upper opening 11. The tube-like extension 9 thus acts as a calming pipe for the oil to be measured in order to achieve more accurate measuring of the filling level.

All features cited in the above description and in the claims can be selectively combined at random with the features of the independent claims. The disclosure of the invention is thus not limited to the feature combinations described and claimed, rather all feature combinations meaningful in terms of the invention are to be considered as disclosed.

The invention claimed is:

1. A device for determining the filling level of a fluid in a container, wherein the device is configured as a closure means of the container and comprises at least one sensor element and at least one control unit,
   wherein
   the device comprises at least one energy source and at least one transmitting means for wireless transmission of measured data,
   at least one energy source is a thermal generator,
   the device comprises at least one energy storage device,
   the thermal generator is configured for measuring a time-dependent temperature gradient,
   the thermal generator comprises a signal-conducting connection to the control means, and
   the control means is configured for placing the device from an energy-saving state into a ready-to-measure state.

2. The device according to claim 1, wherein the device comprises at least one receiving means for wireless data transmission.

3. The device according to claim 1, wherein the closure means is configured as an oil draining screw.

4. The device according to claim 1, wherein the sensor element is an ultrasonic transducer.

5. The device according to claim 1, wherein the device comprises at least one tube-like extension, the circumference of which surrounds the sensor element.

6. The device according to claim 5, wherein at least sections of the tube-like extension are adapted in shape and size of the cross-section to the shape and size of the cross-section of the closure means.

7. A method for determining the filling level of a fluid in a container by means of a device according to claim 1, wherein
the device is placed from an energy-saving state into a ready-to-measure state, when the energy storage means comprises an electrical charge sufficient for operating the device and at least one extra condition is met, and
the filling level of the fluid is determined by the device in the ready-to-measure state.

8. The method according to claim 7, wherein the extra condition is a specified time-dependent temperature gradient of the fluid.

9. The method according to claim 8, wherein the time-dependent temperature gradient of an engine oil is determined and that, when the temperature gradient of the engine oil progresses from higher to lower temperatures, this indicates a standstill of the engine and the device is placed from an energy-saving into a ready-to-measure state.

10. The method according to claim 7, wherein the operating state of the engine is determined and in that a switched-off engine is a further extra condition for placing the device from the energy-saving state into the ready-to-measure state.

11. The method according to claim 7, wherein the extra condition is the receiving of an ignition signal of the engine, in that when the ignition signal is received, the device is placed into a ready-to-measure state and the filling level of the fluid is determined.

12. The method according to claim 7, wherein energy converted by the thermal generator in energy-saving state is stored in at least one energy storage means.

13. The method according to claim 7, wherein the measured data is sent via radio transmission to an evaluation means and in that the device, after the measured data has been sent, is placed into an energy-saving state.

14. A vehicle with a device according to claim 1.

15. The device according to claim 1, wherein the container is an oil reservoir of a vehicle.

16. The device according to claim 1, wherein the thermal generator is a thermocouple.

* * * * *